United States Patent
Bassel

(10) Patent No.: US 6,708,297 B1
(45) Date of Patent: Mar. 16, 2004

(54) METHOD AND SYSTEM FOR MONITORING ERRORS ON FIELD REPLACEABLE UNITS

(75) Inventor: Thomas L. Bassel, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 599 days.

(21) Appl. No.: 09/752,193

(22) Filed: Dec. 29, 2000

(51) Int. Cl.[7] .................................................. H02H 3/05
(52) U.S. Cl. ........................................ 714/47; 714/723
(58) Field of Search ............................ 714/47, 25, 29, 714/42, 54, 57, 718, 723, 765; 711/100, 111, 115

(56) References Cited

U.S. PATENT DOCUMENTS

| | | | | |
|---|---|---|---|---|
| 4,873,687 A | * | 10/1989 | Breu | ............................ 714/4 |
| 5,220,668 A | * | 6/1993 | Bullis | ........................ 709/102 |
| 5,404,503 A | * | 4/1995 | Hill et al. | ...................... 714/31 |
| 6,532,552 B1 | * | 3/2003 | Benignus et al. | ............. 714/25 |
| 6,598,179 B1 | * | 7/2003 | Chirashnya et al. | .......... 714/37 |

* cited by examiner

Primary Examiner—Dieu-Minh Le
(74) Attorney, Agent, or Firm—A. Jose Cortina; Daniels Daniels & Verdonik, P.A.

(57) ABSTRACT

A method and system of monitoring errors occurring on field replaceable units is described. At predetermined intervals, storage processors connected to a host system are identified and for each connected storage processor previous information about the storage processor and its corresponding error log is loaded. A path from the host system is connected to each unit and all units are inventoried through the connected storage processor. Each storage processor's pointer is then updated by retrieving all entries in each storage processor's corresponding error log, and new error log entries are detected and matched with its field replaceable unit so that an alert can be transmitted to a customer service center in the event an error is recorded on the error log.

20 Claims, 3 Drawing Sheets

METHOD AND SYSTEM FOR MONITORING ERRORS ON FIELD REPLACEABLE UNITS

BACKGROUND OF THE INVENTION

1. Field of the Invention

This invention relates to a method of monitoring errors occurring on field replaceable units. More specifically, the invention relates to a method of monitoring errors occurring on field replaceable units, typically those inside storage system cabinets. The invention also relates to a system for conducting such monitoring of errors which occur on field replaceable units housed inside of cabinets, and controlled by storage processors.

2. Description of Related Art

Host systems attached to field replaceable units, e.g., such as storage systems, have in the past been required to detect errors that occur on the storage system to allow servicing of the storage system, and to allow a network controlled by the host system to continue to operate in a manner desired. By the term "host system" is typically meant a server which may be connected to multiple storage systems such as those available from EMC Corporation under the trademarks Symmetrix™, Clariion™, etc. In such arrangements, it is important that in the event of an error occurring at a device such as a storage system, that the host system be made aware of the error so that an alert can be dispatched to a service center, which can then service the storage system in which the error occurred to ensure that the network continues to operate smoothly.

More specifically, such storage systems have typically included two storage processors dedicated to controlling the operation of various components of the storage system, and also providing the function of keeping an error log, each independently, so that that error log can be periodically checked by the host system, and if serious error is detected, an alert issued to a service center.

Current designs for monitoring such errors involve, for example, the host or server using the "dev.a" (block I/O) device driver to continuously poll all the storage processors and deliver all error messages to the host management software. Unfortunately, this technique results in many duplicate messages being reported and also results in degraded system performance because unnecessary input and output, i.e., I/O, is done with the storage processors on the storage system.

In an alternative system the storage processors at the storage system directly perform "call outs" on errors to a customer service center without reporting the call out to the host system. A problem with this approach is that there is no way that the host system can track the errors such that the operator of the host system is made aware of recurring errors which may require unique and unusual intervention. In addition, the host's view of available paths to a storage processor is obtained.

Still another approach is to provide an auxiliary service processor used to monitor errors in external storage devices using an I2C bus. The errors are stored in non-volatile random access memory, i.e., NVRAM, on the server's processor's error log, and are accessible to the host system through the use of an adapter by calling into the service processor using a modem or network adapter.

Accordingly, in accordance with the method and system described herein, the disadvantages of prior art systems are avoided, and an efficient method and system of monitoring errors without duplication of reporting and degrading of throughput resulting, while still allowing the host system to maintain an accurate record of errors occurring at remote storage systems such that the host system can control which errors are reported to a service center.

SUMMARY OF THE INVENTION

In one aspect there is provided a method of monitoring errors occurring on field replaceable units in an external cabinet having at least one storage processor. The method includes a first step of reading any error occurring on a field replaceable unit in each cabinet which has a storage processor, and in which the error has been entered into at least one error log by the storage processor. For purposes of this disclosure, examples of field replaceable units include the power supplies, disks, fans, controller boards, memory, or other components which can incur errors, and which are replaceable on service calls by field service technicians. At predetermined intervals, all storage processors connected to the host system are identified by the host system. For each connected storage processor, previous information about the storage processor and its corresponding error log is loaded. A path is selected from the host system to each storage processor, and all field replaceable units are inventoried through each connected storage processor. Each storage processor's pointer is then updated by retrieving all entries in each storage processor's corresponding error log, and new error log entries are detected in each error log and matched with its corresponding field replaceable unit, whereby an alert can be transmitted to a customer service center in the event an error is recorded on the respective error logs.

In a further aspect, if a path cannot be established for any storage processor, there occurs an attempt to re-establish the path after a predetermined amount of time has elapsed. If the path cannot be re-established after the predetermined period of time, it is then determined if there is another path available. If there is no other path available, an alert is transmitted to a customer service center. Alternatively, if there is another path available, another path is selected from the host system to the field replaceable unit.

In an alternative aspect, there is described a host system for monitoring errors occurring on field replaceable units. Each field replaceable unit is of the type controlled or interacting with at least one storage processor capable of recording errors in an error log associated with the storage processor. The storage processors are connectable to the host system. The host system includes a monitor agent programmed for identifying at predetermined intervals all storage processors connected to the host system, and for each connected storage processor, loading previous information about the storage processor and its corresponding error log. The monitor agent in the host system is further programmed for selecting a path to each storage processor to which it is connected for conducting an inventory of all its field replaceable units. The monitor agent further serves to update each storage processor's pointer in the host system by retrieving old entries in each storage processor's corresponding error log, and for detecting new error log entries in each error log, for matching the error log entry corresponding field replaceable unit such that the host system can be instructed to transmit an alert to a customer service center in the event a new error is recorded on an error log.

Yet still further, the monitor agent can be programmed such that for any connected storage processor, if the path cannot be established, the host system attempts to re-establish the path after a predetermined period of time, and if the path cannot then be re-established after that period of time, determining if there is another path available. If there is another path available, the host system selects another path to the field replaceable unit. If there is no other path available, the host system is programmed to transmit an alert to a customer service center.

BRIEF DESCRIPTION OF THE DRAWINGS

Having thus briefly described the invention, the same will become better understood from the following detailed discussion, made with reference to the appended figures wherein.

DETAILED DISCUSSION

Figure 1:
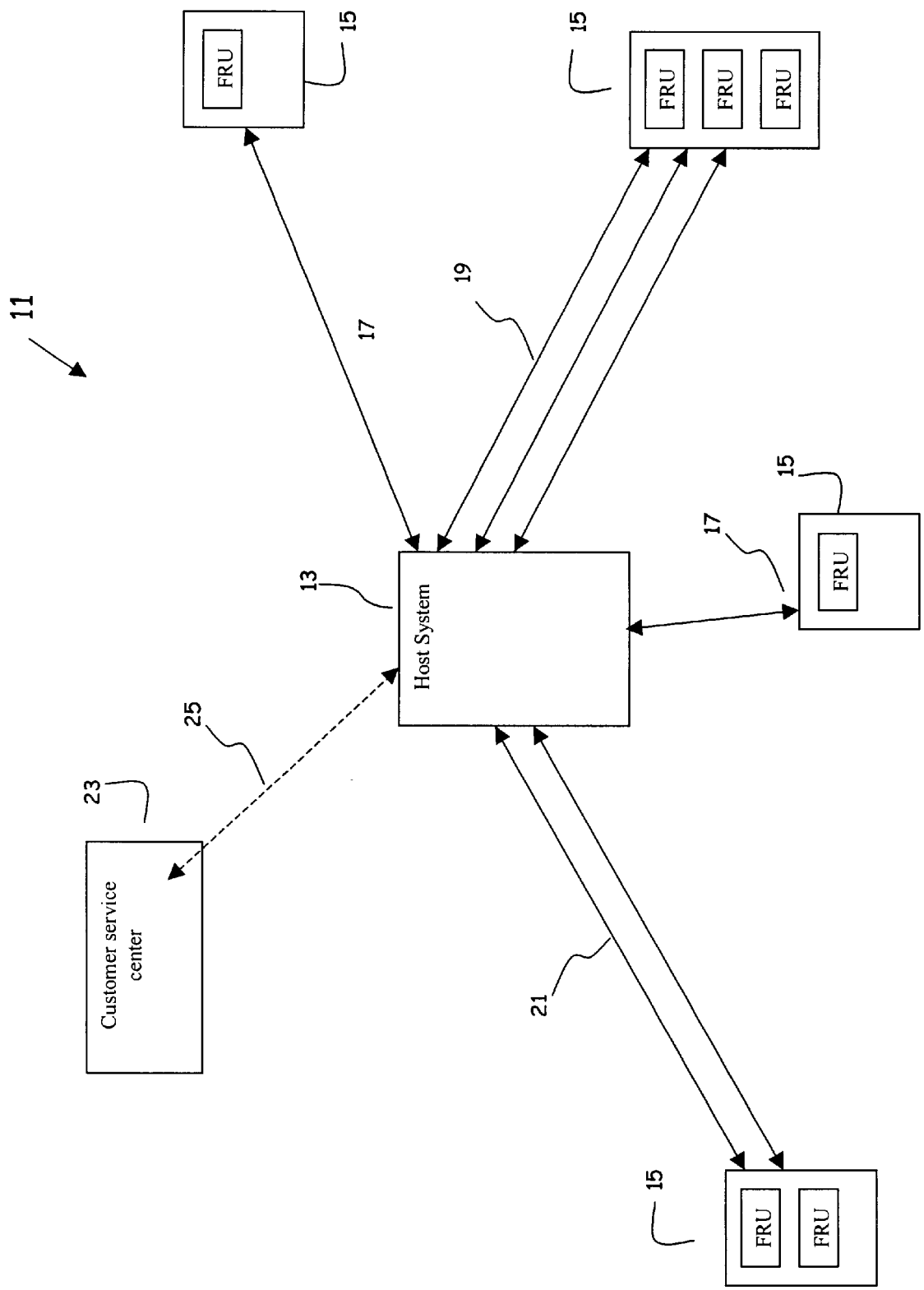
FIG. 1 is a block diagram showing a typical network configuration employing a host system with multiple cabinets such as storage systems, which house field replaceable units, connected thereto, and with the host system having a communication connection to a customer service center.

FIG. 1 illustrates a typical environment for the method and system described herein. The system 11 includes a host system 13 connected to storage processors housed in cabinets 15, which are in turn associated with multiple field replaceable units also housed in the cabinets 15. The host system 13 is connected to the storage processors through network connections 17, 19 and 21. The network connections 17, 19 and 21 are shown as being different numbers of lines to represent different levels of throughput capability, depending on the communication throughput required. A communication line 25 can be, for example, a simple modem connection or other type connection for transmission of short and routine messages to a customer service center 23 whenever an error is logged at a storage processor 15, and detected at the host system 13. On the other hand, due to throughput required, the connections 17, 19 and 21 are typically Fibre Channel of the type well known to those of ordinary skill in the art.

For purposes of this description, such a host system can be a conventional server, managing multiple field replaceable units housed in cabinets 15. Such cabinets 15 can be, for example, as a complete assembly, storage systems such as those available from EMC Corporation under the trademark Clariion™, or other like equivalent type systems.

Figure 2:
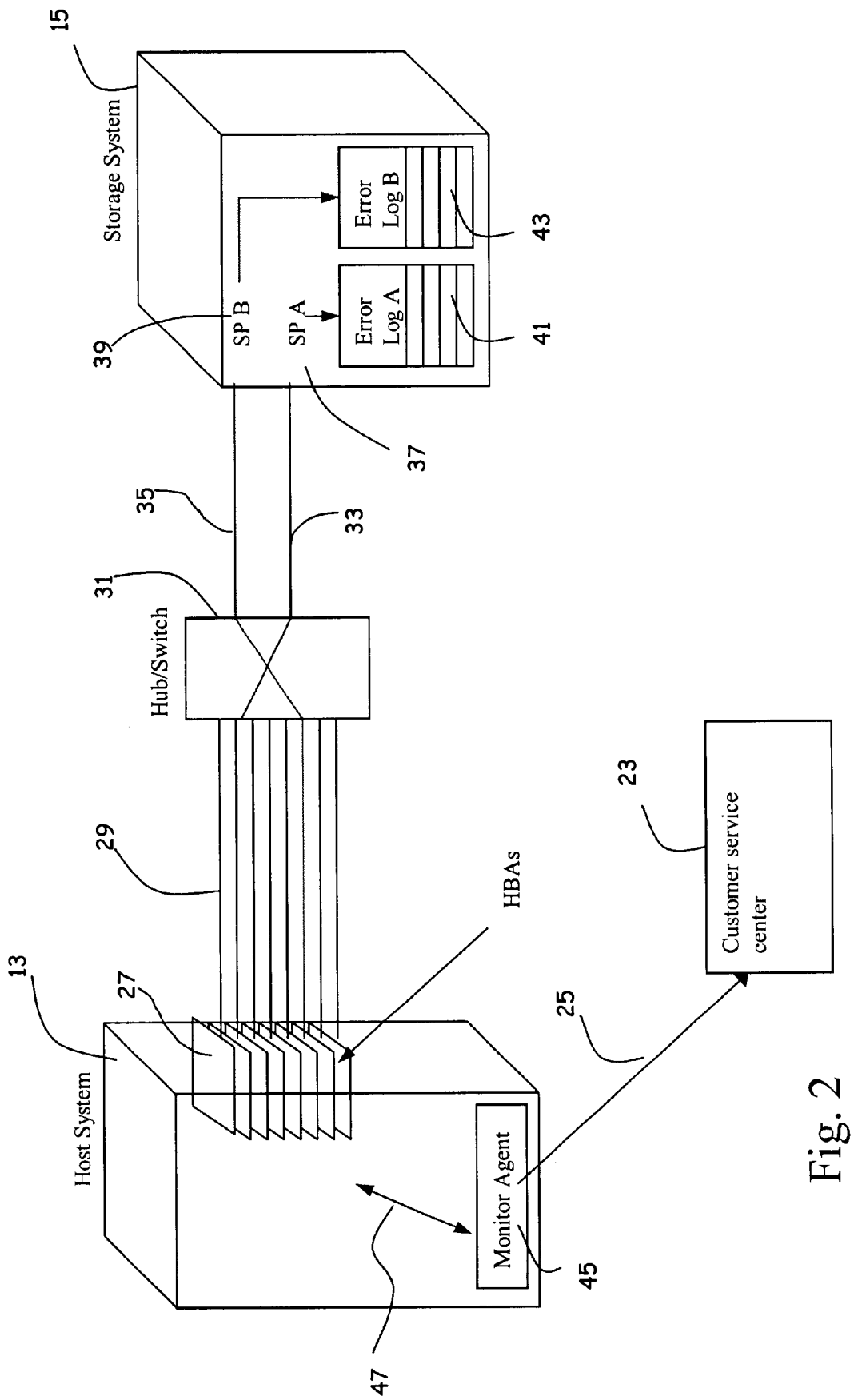
FIG. 2 is a more detailed block diagram schematically illustrating how a host system is connected to a cabinet such as a storage system as shown in FIG. 1, and showing a direct connection to a customer service center from the host system.

FIG. 2 illustrates in greater detail a typical connection between a host system 13, e.g., server, and a storage system 15. The host system includes a plurality of host bus adapters 27 for connection to a communications cable 29. Such a communications cable can be, for example, as previously discussed, conventional Fibre Channel which is well known to those of ordinary skill in the art. More specifically, the cable 29 to the storage system 15 provides multiple paths to the storage system by connection to the host bus adapters 27. A path is typically a Fibre Channel which provides a SCSI path, etc. as will be readily apparent to those of ordinary skill in the art. A hub or switch 31 is connected between the storage system 15 and the host system 13 to connect respective storage processors 37 and 39 to their respective path on the cable 29.

The adapters 27 are well known devices, typically a card which plugs into the backplane of the host system 13 and has a Fibre Channel connector. Such an adapter typically fits into a PCI slot, although as an alternative, onboard chips, which are technically not considered adapters, may provide a similar function. In a more specific aspect, an adapter is not innately part of the entire system, and is plugged into an expansion slot in the host system 13. The adapters allow communications between the host 13 microprocessor and an external device such as the storage system 15. The storage system 15 typically includes two storage processors 37 and 39 which maintain error logs 41 and 43 respectively. The error logs can be stored, for example, in non-volatile random access memory, i.e., NVRAM, such that in the event of a power outage, error information is not lost upon the system losing power.

The cabinets 15 are described above as possibly being storage systems 15 for purposes of this description. This is being done because it is particularly appropriate since such storage systems 15 are closely tied to host systems 13 such as servers. On the other hand, the application described herein is not necessarily limited to a storage system 15 and could conceivably extend to anything that is remote, and tied to a centralized host server system. Such an alternative cabinet or device could be, for example, a refrigerator having two storage processors with onboard intelligence for purposes of monitoring errors, or other like device as will be readily apparent to those of ordinary skill in the art, and connected to a host system 13 such as a server, which functions to identify when such errors occur so that a notification can be provided to a customer service center 23.

As may be appreciated from FIG. 2, and previously discussed, the hub/switch 31 serves to establish two separate connections 33 and 35 from respective paths on cable 29 to the storage processors 37 and 39. As will be appreciated, this connection is not limited to Fibre Channel, and other types of connections can be substituted in place of the Fibre Channel.

In a system such as this, in the past, errors were monitored through the use of a device driver, i.e., "dev.a" (block I/O) device driver, which was resident in the host system 13. The device driver continuously polled all of the storage processors in the cabinets 15. The storage processors allowed access to all of the error messages relating to all field replaceable units in the cabinets 15. This resulted in many duplicate messages being reported and degraded system performance because unnecessary input/output was done. Thus, in the past, the host system 13 would retrieve everything blindly across any adapter, and storage processor, to the system, etc., typically on a periodic basis, for example, every 30 seconds.

In accordance with the system and method described herein, there is provided a monitoring agent 45 which is typically a program routine which serves to control communications by an interaction path 47 internal to the host system 13 with the host bus adapters 27, and also to transmit through a communications line 25 any error messages required to be transmitted to a customer service center 23.

Figure 3:
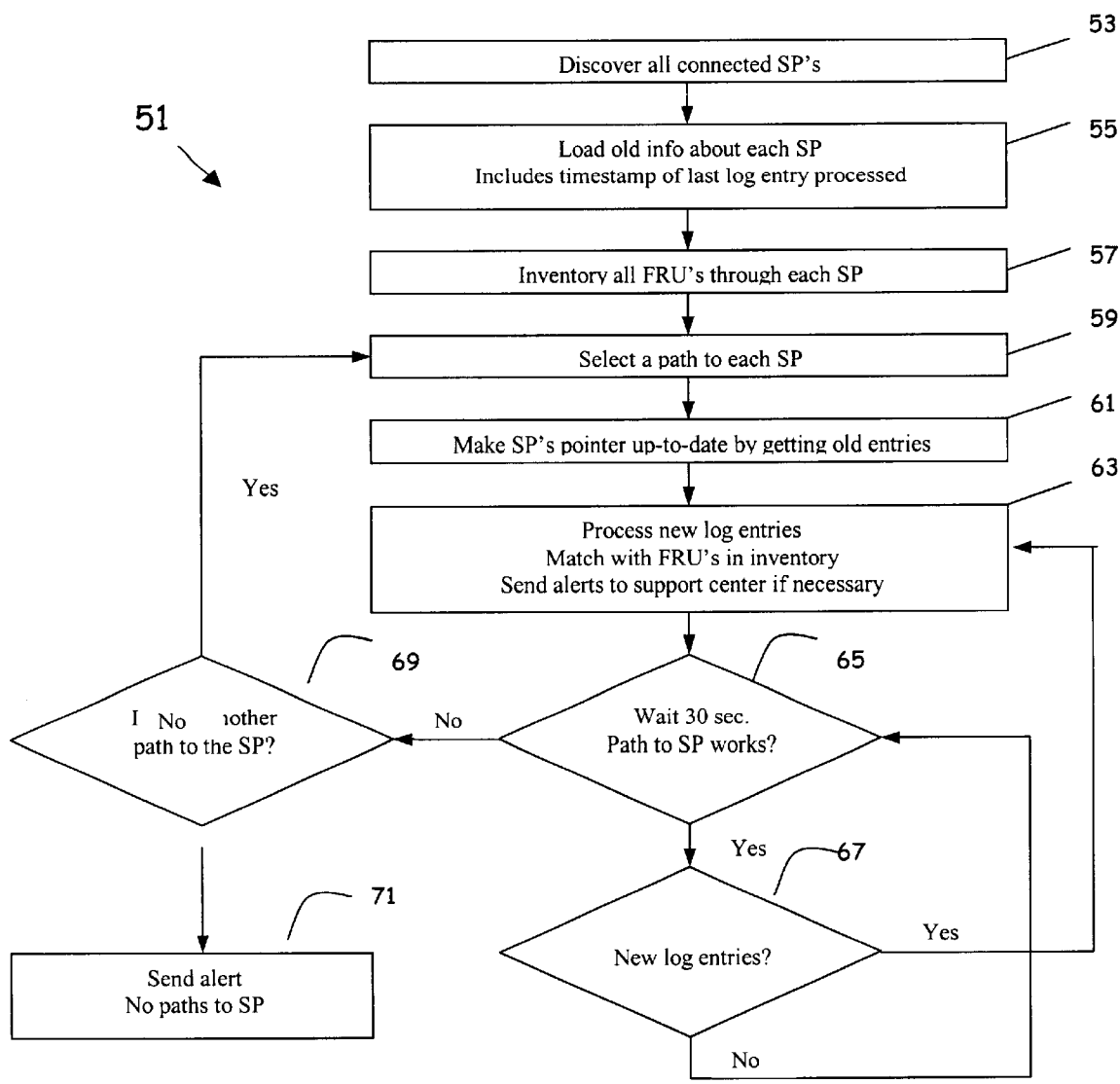
FIG. 3 is a flow diagram illustrating how the method and system herein operate in the context of an arrangement of a host system, i.e., a server, having multiple storage systems, connected thereto.

In operation, the monitoring agent 45 first detects all connected storage processors 37 and 39 for all field replaceable units in cabinets 15 in a network arrangement such as illustrated in example form in FIG. 1. Previous information about each storage processor is loaded by the monitoring agent 45 from a file located on the host system 13, and which includes a time stamp of the last log entry process. Each one of the log entries in the error log includes a time stamp. This process is further described in greater detail with reference to FIG. 3 which shows a flow block diagram 51 identifying the operation of the system as controlled by the monitor agent 45.

At step 53, as previously discussed, the monitor agent 45 shown in FIG. 2, discovers and identifies all connected storage processors 37 and 39. Thereafter, at step 55, old information about each storage processor 37 and 39, including a time stamp of the last entry log processed, is loaded onto the server or host system 13. At step 57 all field replaceable units in storage systems 15, are inventoried through each of the individual storage processors 37 and 39. At step 59 a path is selected to each storage processor for each storage system 15.

At this point, at step 61 each individual storage processor 37 and 39 pointer is updated in the host system 13 by retrieving old entries. At step 63 new log entries in the error logs 41 and 43 are processed and matched with the field replaceable units 37 and 39 in inventory, and if a new log entry indicates an error, an alert is sent by the monitor agent 45 to the customer service center 23 for servicing of the field replaceable unit in the storage system 15.

At step 65, if no path to a particular storage processor 37 and 39 is available or works, a predetermined time period is allowed to elapse, for example, 30 seconds, to determine if the path to the storage processor 37 and 39 previously having no path connecting thereto can be established. If the path is established, at step 67, the same process with respect to new log entries as conducted at step 63 are conducted for the particular storage processor 37 or 39 to which the path has been established. If there are new log entries, then the process proceeds to step 63 and an alert is sent to a customer service center 23 by the monitor agent 45, if necessary. If there are no new log entries, then the process returns from step 67 to step 65 before detecting whether the path to the storage processor 37 or 39 works, and then checking to see if there are new log entries at step 67.

Alternatively, if after 30 seconds, at step 65 it is determined that the path to the storage processor 37 or 39 for which there was no path previously established cannot be established, then the system and monitor agent 45 interacts with the host bus adapters 27 to determine if there is another path available on the Fibre Channel to the specific storage processor 37 or 39 for which no path could be established. If no additional path is available, then at step 71 an alert is sent by the monitor agent 45 to the customer service center 23. On the other hand, if there is another path available, then the process returns to step 59 to select a path to the storage processor 37 or 39, and repeats the process as previously described.

In accordance with the information retrieved, including the fact that the time stamp information is received, space can be conserved on the storage processors and the respective non-volatile random access memory, i.e., NVRAM, error logs. Information about the individual field replaceable units 15 is obtained by an inventory of all of the storage processors for the field replaceable units when the monitor agent 45 is activated. Thus, in order to avoid duplication of error messages and the lack of ability to discriminate between field replaceable units for which error messages are received, for each field replaceable unit, the information retrieved and loaded into the host system 13 or server includes: (1) time stamp information; (2) an error code indicating the type of error in the error log; (3) field replaceable unit number; (4) a description of the field replaceable unit, which could be optionally kept on the host system or server 13 and matched to the field replaceable unit number previously described when it is received; and optionally (5) an ASCII description of the error.

Accordingly, in accordance with the method and system described herein, one advantage provided is low overhead for the storage processors 37 and 39 in what is essentially a performance-sensitive storage system 15. The method and system provides a reliable and redundant method of monitoring such that if an active path fails, another one is selected and duplicate error messages are screened out. The error log entries that are received by the host can undergo further processing before the administrator sees them, such as thresholding of lower-priority errors. The monitor agent 45 is able to keep up with the last message processed for each individual storage processor 37 or 39 in the storage system 15. When there is a path switch, all of the error log entries with a time/date stamp less than the last message are read and discarded and the remaining log entries are processed such that each of the storage systems can be continuously monitored using the respective path. If all of the paths to the storage system fail, this can be reported to the administrator. This would also indicate to the administrator of the system that a very serious condition has occurred, for example, no input/output, i.e., "I/O" operation can be performed to the storage system's 15 storage processor 37 or 39.

Having thus generally described the invention the same will become better understood from the following claims in which it is set forth in a non-limiting manner.

What is claimed is:

1. A method of monitoring errors occurring on field replaceable units housed in cabinets, with the field replaceable unit interacting with at least one storage processor in the cabinet, and the storage processor being connectable to a host system, comprising:

a) reading any error occurring for each field replaceable unit, which has been entered into at least one error log by said at least one storage processor;

b) at predetermined intervals, identifying all storage processors connected to the host system;

c) for each connected storage processor, loading previous information about the storage processor and its corresponding error log;

d) selecting a path from the host system to each storage processor, and inventorying all field replaceable units through each connected storage processor;

e) updating each storage processor's pointer in the host system by retrieving all entries in each storage processor's corresponding error log; and f) detecting new error log entries in each error log, and matching the error log entry with its corresponding field replaceable unit, whereby an alert can be transmitted to a customer service center in the event a new error has been recorded in an error log.

2. The method of claim 1, wherein each one of said cabinets is a storage system having two storage processors, and a plurality of field replaceable units.

3. The method of claim 1, wherein said host system is a server.

4. The method of claim 1, further comprising:

for any storage processor, if a path cannot be established, attempting to re-establish the path after a predetermined period of time;

if the path cannot be re-established after the predetermined period of time, determining if there is another path available;

if there is another path available, return to step (d) and select a path from the host system to the storage processor; and if there is no other path available, transmitting an alert to a customer service center.

5. The method of claim 4, further comprising, after establishing a path to each storage processor, determining if there are any new log entries for each storage processor, and if there are, detecting the new log entries with the host system at step (f).

6. The method of claim 1, wherein the host system is a server, and the cabinets are storage systems connected to the server through cable.

7. The method of claim 6, wherein the server comprises multiple host bus adapters connected to different paths on a cable connected to the server, and said cable being connected to a hub/switch for connecting individual host bus adapters to individual storage processors in each one of said storage systems.

8. The method of claim 1, further comprising transmitting an alert to a customer service center in the event an error is recorded on an error log and read by the host system, and said alert containing specific information about which field replaceable unit recorded the high severity error and the nature of the error.

9. The method of claim 1, wherein said predetermined interval is approximately thirty seconds.

10. The method of claim 1, wherein said error logs are stored in non-volatile random access memory in the cabinets.

11. A host system for monitoring errors on field replaceable units housed in cabinets, the field replaceable unit interacting with at least one storage processor in the cabinet which is capable of recording errors in an error log therein, each storage processor connectable to a host system, and the host system comprising:

a monitor agent programmed for identifying at predetermined intervals all storage processors connected to the host system, and for each connected storage processor, loading previous information about the storage processor and its corresponding error log;

the monitor agent being further programmed for selecting a path from the host system to each storage processor connected to the host system, and for inventorying all field replaceable units connected to the host system through each connected storage processor; and the monitor agent further programmed for updating at the host system each storage processor's pointer by retrieving old entries in each storage processor's corresponding error log, and for detecting new error log entries in each error log, for matching the error log entry with its corresponding field replaceable unit, whereby the host system can be instructed to transmit an alert to a customer service center in the event a high severity error is recorded on an error log.

12. The system of claim 11, wherein each one of said cabinets is a storage system having two storage processors, each with corresponding error logs, and wherein the monitor agent is programmed for connecting to and monitoring of the storage systems.

13. The system of claim 11, wherein said host system is a server.

14. The system of claim 11, wherein the monitor agent is further programmed so that:

for any connected storage processor, if a path cannot be established, having the host system attempt to re-establish the path after a predetermined period of time, if the path cannot be re-established after the predetermined period of time, determining if there is another path available, and if there is another path available, causing the host system to select a path to the storage processor; and the host system being further programmed to transmit an alert to a customer service center in the event there is no other path available.

15. The system of claim 14, wherein the monitor agent is capable of, after a path is established to each storage processor, determining if there are any new log entries for each storage processor, and if there are, having the new log entries and associated storage processor identification transmitted to the host system.

16. The system of claim 11, wherein the host system is a server and the cabinets are storage systems connectable to the server through cable.

17. The system of claim 16, wherein the server comprises multiple host bus adapters connectable to different paths on at least one cable, for connection through a hub/switch to individual storage processors on each one of said storage systems.

18. The system of claim 11, wherein the host system further comprises a communication facility for transmitting an alert to a customer service center in the event an error is recorded on an error log, and said communication facility being capable of providing an alert containing specific information about which field replaceable unit was recorded the high severity error and the nature of the error.

19. The system of claim 11, wherein the monitor agent is programmed such that the predetermined intervals are approximately thirty seconds.

20. The system of claim 11, wherein the cabinets further comprise non volatile random access memory for storing said error logs.

* * * * *